United States Patent [19]
Lipkin

[11] Patent Number: 6,138,148
[45] Date of Patent: Oct. 24, 2000

[54] CLIENT INTERMEDIATION OF SERVER APPLICATIONS

[75] Inventor: Efrem Lipkin, Berkeley, Calif.

[73] Assignee: Sun Microsystems, Inc., Palo Alto, Calif.

[21] Appl. No.: 09/099,489

[22] Filed: Jun. 18, 1998

[51] Int. Cl.[7] .............................. G06F 13/38; G06F 15/17
[52] U.S. Cl. ........................ 709/206; 709/206; 709/209; 709/201; 705/40; 395/200
[58] Field of Search .............................. 395/200; 705/40; 709/201, 206, 209

[56] References Cited

U.S. PATENT DOCUMENTS

| | | | |
|---|---|---|---|
| 5,619,648 | 4/1997 | Canale et al. | 395/200 |
| 5,732,218 | 3/1998 | Bland et al. | 395/200 |
| 5,758,083 | 5/1998 | Singh et al. | 395/200 |
| 5,920,847 | 7/1999 | Kolling et al. | 705/40 |
| 5,951,636 | 9/1999 | Zerber | 709/202 |
| 5,961,586 | 10/1999 | Pederson | 709/201 |
| 5,974,449 | 10/1999 | Chang et al. | 709/206 |

*Primary Examiner*—Zarni Maung
*Assistant Examiner*—Farzaneh Farahi

*Attorney, Agent, or Firm*—Park & Vaughan LLP

[57] ABSTRACT

One embodiment of the present invention provides a method and an apparatus for providing a client-side intermediary that communicates with an application on a second server computer system. The method operates by receiving a composite message at a client computer system from a first server computer system, and examining type information from the composite message. This type information specifies how the composite message is formatted, and can be used to select an application that is capable of processing the composite message. The method uses the type information to look up a network address of the application residing on the second server computer system. This address is used to forward the composite message to the application on the second server computer system. The above embodiment can be implemented within a browser on the client computer system, or within a separate application on the client computer system. A return communication can be facilitated by receiving a return composite message at the client computer system from the second server computer system, and examining type information from the return composite message. This type information is used to look up an address of a source application on the network, and this address is used to forward the return composite message to the source application.

27 Claims, 3 Drawing Sheets

CLIENT INTERMEDIATION OF SERVER APPLICATIONS

BACKGROUND

The present invention relates to client-server architectures in distributed computer systems. More particularly, the present invention relates to a method and an apparatus that operates on a client computing system and implements what appears to be an application located on the client computing system, but which actually acts as a proxy far an application on a remote server computing system.

The recent proliferation of client-server based distributed systems has led to the development of numerous server applications, located on server computer systems, that interact with client applications, located on client computer systems. For example, one recently developed client application is an "electronic wallet," which contains financial instruments in electronic form, such as electronic cash, electronic debit cards or electronic credit cards. An electronic wallet typically resides on a client computer system, and performs financial transactions, such as purchases, by communicating with a server application on a server computer system. For example, a user on a client computer system might decide to purchase software from a server computer system that belongs to a software vendor. Protocols such as the Secure Electronic Transactions (SET) protocol and the Open Trading Protocol (OTP) enable the server computer system to receive a payment for the software from an electronic wallet on the client computer system. Using these protocols, this payment is automatically deducted from an account linked to the electronic wallet on the client computer system, and is automatically credited to an account linked to an application on the server computer system.

One problem with many existing server-based applications, as well as with protocols such as SET and OTP, is that they are designed to interact with a client application that resides on a client computer system. Locating an application, such as an electronic wallet, on a client computer system has certain disadvantages. First, an owner of the client application may want to use the client application from a number of different client computer systems. In this case, if the client application is tied to a particular client computer system, the owner of the client application cannot access the client application from another client computer system. Second, installing a client application, such as a wallet, on a client computer system can take up storage space on the client computer system and may require additional maintenance on the client computer system—to update the client application, for example. Additionally, retrieving code from a server computer system can incur a long delay in downloading the code from the server computer system.

SUMMARY

The present invention allows a client application to interact with existing server applications and protocols, and allows the owner of the client application to use the client application from different client computer systems. One embodiment of the present invention provides a method and an apparatus for providing a client-side intermediary that communicates with an application on a second server computer system. The method operates by receiving a composite message at a client computer system from a first server computer system and examining type information from the composite message. This type information specifies how the composite message is formatted, and can be used to select an application that is capable of processing the composite message. This type information is used to look up an access mechanism that can be used to access the application residing on the second server computer system. This access mechanism is used to forward the composite message to the application on the second server computer system. The above embodiment can be implemented within a browser on the client computer system, or within a separate application on the client computer system. A return communication can be facilitated by receiving a return composite message at the client computer system from the second server computer system, and examining type information from the return composite message. This type information is used to look up an access mechanism for a source application on the first server computer system, which is used to forward the return composite message to the source application. Receiving commands from a user at a client computer system.

Thus, the present invention allows an application on a first server to communicate with what appears to be an application located on a client computer system. In reality, an intermediary on the client computer systems forwards the communications to an application on a second server. This allows a client application program, such as an electronic wallet, to be located on an accessible server on a network. This makes it possible for the owner of an application program, such as a wallet, to use the application program from different client computer systems. It additionally frees the client computer system from the burden of storing the application program.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave.

DESCRIPTION OF ONE EMBODIMENT

Figure 1:
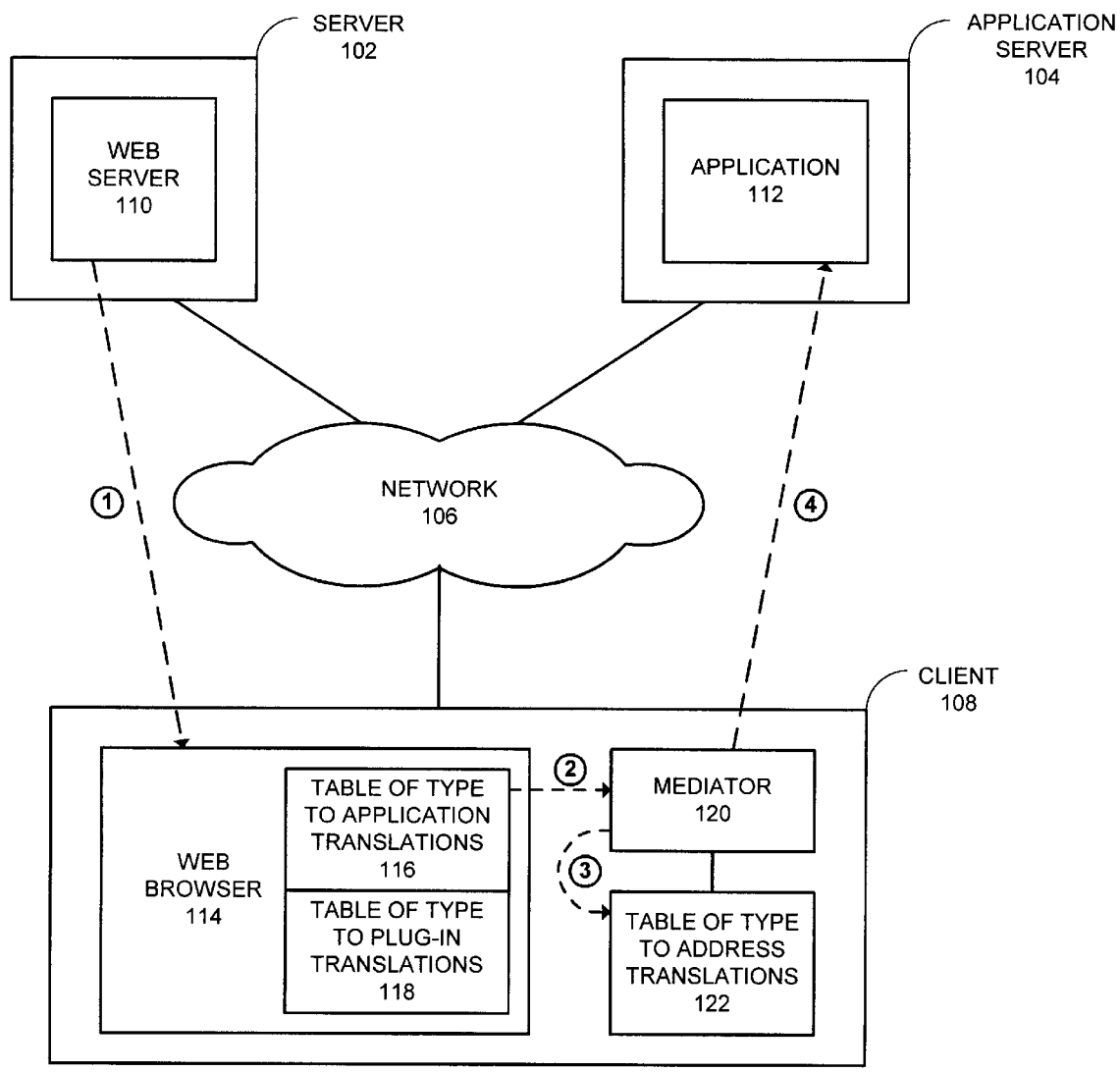
FIG. 1 illustrates a distributed computer system in accordance with a first embodiment of the present invention.

FIG. 1 illustrates a distributed computer system in accordance with a first embodiment of the present invention. The embodiment illustrated in FIG. 1 includes server 102 coupled to server 104 and client 108 through network 106. Network 106 generally refers to any type of wire or wireless link between computers, including, but not limited to, a local area network, a wide area network, or a combination of networks. In one embodiment of the present invention, network 106 includes the Internet. In another embodiment, network 106 includes multiple networks, including a local area network and the Internet. Client 108 may include any node on a computer network including computational capability and including a mechanism for communicating across network 106. Servers 102 and 104 may include any node on a computer network including computational capability, and possibly data storage capability, as well as a mechanism for servicing requests from a client for computational or data storage resources.

In the illustrated embodiment, server 102 includes web server 110. Web server 110 is an application program residing on server 102 that facilitates the presentation of at least one website to clients of server 102. To this end, web server 102 presents inter-linked pages of text and graphical images and programs to be accessed by browsers on client systems. (For purposes of this detailed description, a browser is a program, typically located on a client computer system, which allows a user to navigate through collections of data, such as web sites, on remote computer systems.) In the illustrated embodiment, web server 110 is accessible from any browser coupled to the World Wide Web via the Internet. Although the illustrated embodiment operates in the context of a web server 110 and a web browser 114, the present invention will work for numerous types of client programs and server programs, and is not limited to just web servers and web browsers.

Application server 104 contains application 112, which receives communications from client 108, and performs operations that appear to be performed by an application located on client 108. In one embodiment of the present invention, application 112 includes code and data to implement an electronic wallet on application server 104. (For purposes of this detailed description, an electronic wallet is a collection of financial instruments, such as credit cards, debit cards and cash in electronic form, possibly stored on a smart card. An electronic wallet is typically implemented through an application program that performs transactions on the financial instruments.) In general, application 112 may implement any type of application, not only an electronic wallet. Note that application 112 can receive communications from other clients besides client 108. This allows the owner of an application, such as a wallet, to use the application from different clients. It also allows the server to act as a client for multiple users.

Client 108 includes web browser 114, mediator 120 and table 122. Web browser 114 includes code and data that allows a user on client 108 to navigate through web pages located on servers distributed across network 106. One example of such as browser is Netscape Navigator 3.0, produced by the Netscape Communications Corporation of Mountain View, Calif. In the illustrated embodiment, web browser 114 contains table 116, which includes translations from type information to identifiers for applications, as well as table 118, which includes translations from type information to identifiers for plug-ins. (For purposes of this detailed description, a plug-in is executable code that can be added to an application program that is able to share a window with the application program.) Tables 116 and 118 may take the form of a Helper Application Table, which is a table inside of a browser that maps type information for a composite message to application programs that are able to process the composite message.

Mediator 120 is an application program, or a plug-in that forwards communications to application 112 on application server 104. Mediator 120 communicates with table 122, which contains translations from type information to addresses for remote applications, such as application 112 on application server 102.

The system illustrated in FIG. 1 operates as follows. First, a user operating web browser 114 on client 108 initiates some type of transaction with web server 110 on server 102. In response, web server 110 sends a composite message across network 106 to web browser 114. (For purposes of this detailed description, a composite message can be any type of data transfer across a network that includes one or more transmissions. A composite message may include, but is not limited to, a single document, a collection of documents, a single message, a multi-part message, a single file or a set of files.) Next, web browser 114 reads type information from the composite message in order to determine what type of composite message has been received from web browser 114. This type information may be determined by looking at an extension on the filename for a file associated with the composite message (For example a ".txt" extension may indicate a file containing ASCII text). Alternatively, the type information may be read from a composite message header, such as a Multipurpose Internet Mail Extensions (MIME) type header. (MIME is a standard for type information appended to a composite message, including information specifying how information within the composite message is formatted and/or partitioned.) Next, the type information is used to lookup an application or a plug-in that is able to process the composite message. This lookup may be performed by accessing table 116, which contains type-to-application translations, or by accessing table 118, which contains type-to-plig-in translations.

If the type information specifies a client application, such as a wallet, with an implementation on a remote server, the composite message is sent to mediator 120. Mediator 120 uses the type information to look up an address of the application on the remote server in table 122, which contains type-to-address translations. In one embodiment of the present invention, this address of a remote application includes a Universal Resource Locator (URL). The composite message is then forwarded to the application on the remote server. Optionally, the composite message can be forwarded within an appropriate protocol to it to make it appear as if it originated from a client application on client 108.

Alternatively, if the type information specifies a client application that exists on client 108, the composite message is sent to the client application directly.

DESCRIPTION OF ANOTHER EMBODIMENT

Figure 2:
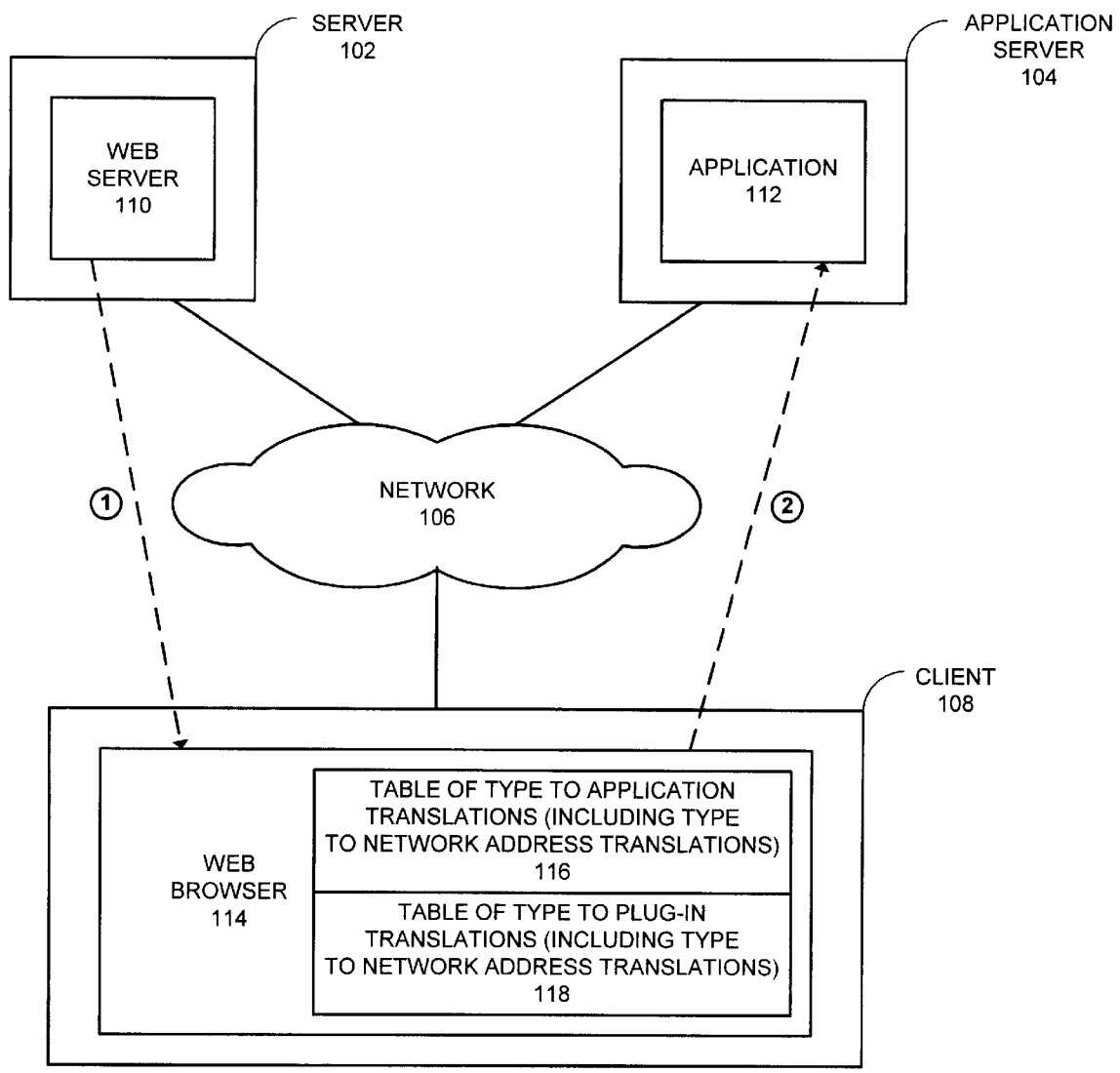
FIG. 2 illustrates a distributed computer system in accordance with a second embodiment of the present invention.

FIG. 2 illustrates a distributed computer system in accordance with a second embodiment of the present invention. In this embodiment, instead of using a separate mediator 120 to forward the composite message to application 112 as in FIG. 1, web browser 114 performs the forwarding itself. In this embodiment, web browser 114 is modified so that it can store type-to-address translations in tables 116 and 118. If the type information specifies a client application, such as a wallet, with an implementation a remote server, the corresponding entry in either table 116 or 118 contains a remote address for the application. In this case, the composite message is sent to the remote address. Alternatively, if the type information specifies a client application that exists on client 108, the composite message is sent to the client application directly.

METHOD OF OPERATION

Figure 3:
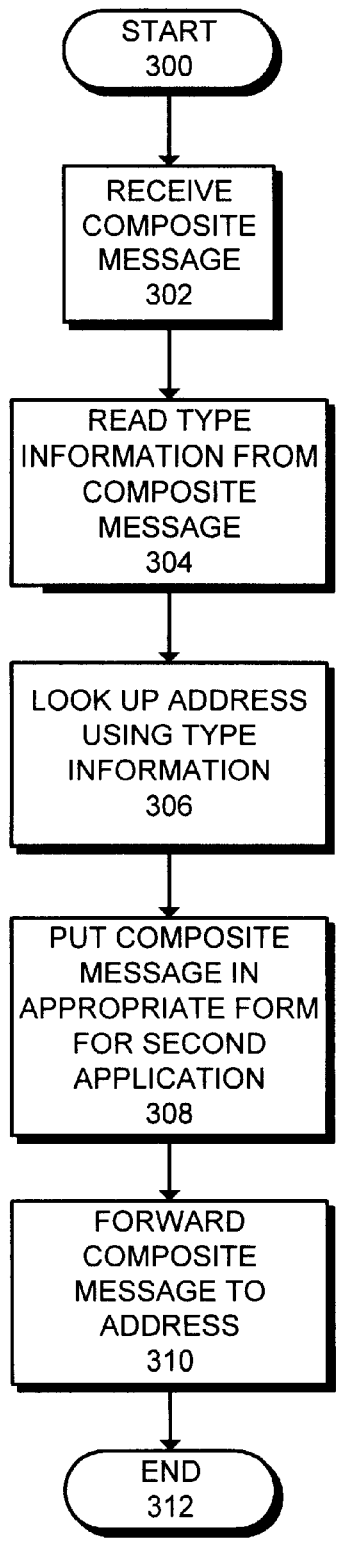
FIG. 3 is a flow chart illustrating some of the operations involved in forwarding communications to an application on a remote server accordance with an embodiment of the present invention.

FIG. 3 is a flow chart illustrating some of the operations involved in forwarding communications to an application on a remote server accordance with an embodiment of the present invention. The system starts at state 300 and proceeds to state 302. In state 302, the system receives a composite message. In the embodiment illustrated in FIG. 1, this corresponds to web browser 114 in FIG. 1 receiving a composite message from web server 110 on server 102. This composite message can be in response operations performed by a user of client 108 in accessing web server 110 through browser 114. Next, the system proceeds to state 304. In state 304, the system reads type information from the composite message. This type information specifies how the composite message is formatted, and thereby implicitly specifies which application programs can read the composite message. This type information may be determined by reading type information, which accompanies the composite message, such as MIME-type information. Alternatively, the type information may be determined by reading a filename extension for a file associated with the composite message. The system next proceeds to state 306.

In state 306, this type information is used to look up an address of an application on a remote server. In the embodiment illustrated in FIG. 1, this corresponds to mediator 120 looking up an address in table 122. In the embodiment illustrated in FIG. 2, this corresponds to web browser 114, looking up an address in either table 116 or table 118. The system next proceeds to state 308.

In state 308, the system puts the composite message in appropriate form for a second application. This may include modifying the composite message to make the composite message appear as though it originated from a client computer system, instead of from web server 110. It may also include modifying the composite message to make the composite message appear as through it originated from another server. In one embodiment of the present invention, this is accomplished by prepending http information onto the composite message. Next, the system proceeds to state 310. In state 310 the system forwards the composite message to the address that was looked up in state 306. In the embodiments illustrated in FIGS. 1 and 2, this corresponds to the composite message being forwarded across network 106 to application 112 on application server 104.

Although the above-illustrated embodiment of the present invention illustrates a limited case where communications between a first server computer system and a client computer system are redirected to a second server computer system, these interactions can be generalized to larger numbers of server computer systems. For example, communications to an application on the client computer system can be redirected multiple server computer system, wherein the multiple server computer systems each handle portions of the client application program.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention; the scope of the invention is limited only by the appended claims.

What is claimed is:

1. A method for providing a client-side intermediary that redirects communications directed to an application on a client computer system to a remote application on a second server computer system, comprising:

receiving, at the client computer system, a composite message from a first server computer system directed to the application on the client computer system;

examining type information from the composite message, the type information specifying how the composite message is formatted and thereby implicitly specifying applications that are capable of processing the composite message;

using the type information to lookup the address of the remote application one the second server computer system that is capable processing the composite message;

wherein the lookup is performed using at least one table that translates the type information into an address of the remote application on the second server computer system;

using the address to engage an access mechanism through which the remote application on the second server computer system can be accessed; and forwarding the composite message and subsequent composite messages of the same type to the remote application on the second server computer system using the access mechanism so that the remote application appears to exist on the client computer system in spite of the fact that the remote application actually exists on the second server computer system.

2. The method of claim 1, further comprising:

receiving, at the client computer system, a return composite message from the second server computer system;

examining return type information from the return composite message the return type information specifying how the return composite message is formatted and thereby implicitly specifying applications that are capable of processing the return composite message;

using the return type information to engage a source access mechanism through which a source application on the first server computer system can be accessed; and forwarding the return composite message to the source application on the first server computer system using the source access mechanism.

3. The method of claim 1, wherein:

receiving the composite message includes receiving the composite message at a browser on the client computer system; and using the type information to look up the access mechanism includes using MIME-type information to look up an entry in a helper application table in the browser, the entry in the helper application table including the address of the application on the second server computer system.

4. The method of claim 1, wherein:

receiving the composite message includes receiving the composite message at a client-side application on the client computer system; and wherein forwarding the composite message to the remote application to the second server computer system includes forwarding the composite message from the client-side application to the remote application on the second server computer system.

5. The method of claim 1, wherein the type information includes Multipurpose Internet Mail Extensions (MIME) type information.

6. The method of claim 1, wherein the type information is specified by a filename extension for a file associated with the composite message.

7. The method of claim 1, wherein forwarding the composite message to the remote application on the second server computer system, includes repackaging the composite message.

8. The method of claim 1, wherein the address includes a Universal Resource Locator (URL), and wherein engaging the access mechanism includes referencing the remote application on the second server computer system through the URL.

9. The method of claim 1, wherein the remote application implements an electronic wallet.

10. A method for providing a client-side intermediary that redirects communications directed to an application on a client computer system to a remote application on a second server computer system, comprising:
   receiving, at the client computer system, a composite message from a first server computer system directed to the application on the client computer system;
   examining type information from the composite message, the type information specifying how the composite message is formatted according to the Multipurpose Internet Mail Extensions (MIME) standard and thereby implicitly specifying applications that are capable of processing the composite message;
   using the type information to lookup the a Universal Resource Locator (URL) for the remote application one the second server computer system that is capable processing the composite message;
   wherein the lookup is performed using at least one table that translates the type information into an URL for the remote application on the second server computer system;
   using the URL to engage an access mechanism through which the remote application on the second server computer system can be accessed; and
   forwarding the composite message to the remote application on the second server computer system using the access mechanism; wherein the remote application on the second server computer system implements an electronic wallet.

11. A computer readable storage medium storing instructions that when executed by a computer cause the computer to perform a method for providing a client-side intermediary that redirects communications directed to an application on a client computer system to a remote application on a second server computer system, method comprising:
   receiving, at the client computer system, a composite message from a first server computer system directed to the application on the client computer system;
   examining type information from the composite message, the type information specifying how the composite message is formatted and thereby implicitly specifying applications that are capable of processing the composite message;
   using the type information to lookup the address of the remote application one the second server computer system that is capable processing the composite message;
   wherein the lookup is performed using at least one table that translates the type information into an address of the remote application on the second server computer system;
   using the address to engage an access mechanism through which the remote application on the second server computer system can be accessed; and
   forwarding the composite message and subsequent composite messages of the same type to the remote application on the second server computer system using the access mechanism so that the remote application appears to exist on the client computer system in spite of the fact that the remote application actually exists on the second server computer system.

12. An apparatus that provides a client-side intermediary that redirects communications directed to an application on a client computer system to a remote application on a second server computer system, comprising:
   a receiving mechanism that receives a composite message from a first server computer system directed to the application on the client computer system;
   a reading mechanism, in communication with the receiving mechanism, that reads type information from the composite message, the type information specifying how the composite message is formatted and thereby implicitly specifying applications that are capable of processing the composite message;
   an access mechanism, in communication with the reading mechanism, that uses the type information to trigger an access to the remote application on the second server computer system;
   wherein the access mechanism is configured to use the type information to lookup the address of the remote application one the second server computer system that is capable processing the composite message;
   wherein the lookup is performed using at least one table that translates the type information into an address of the remote application on the second server computer system; and
   a forwarding mechanism, in communication with the receiving mechanism, that forwards the composite message and subsequent composite messages of the same type to the remote application on the second server computer system using the access mechanism so that the remote application appears to exist on the client computer system in spite of the fact that the remote application actually exists on the second server computer system.

13. The apparatus of claim 12, wherein:
   the receiving mechanism is configured to receive a return composite message from the second server computer system;
   the reading mechanism is configured to read return type information from the return composite message the return type information specifying how the return composite message is formatted and thereby implicitly specifying applications that are capable of processing the return composite message;
   the access mechanism is configured to use the return type information to trigger an access to a source application on the first server computer system; and
   the forwarding mechanism is configured to forward the composite message to the source application on the first server computer system using the access mechanism.

14. The apparatus of claim 12, further comprising a browser on the client computer system, the browser including the receiving mechanism, the reading mechanism, the access mechanism and the forwarding mechanism.

15. The apparatus of claim 12, further comprising a client-side application on the client computer system, the client-side application including the receiving mechanism, the reading mechanism, the access mechanism and the forwarding mechanism.

16. The apparatus of claim 12, wherein the type information includes Multipurpose Internet Mail Extensions (MIME) type information.

17. The apparatus of claim 12, wherein the type information is specified by a filename extension of a file associated with the composite message.

18. The apparatus of claim 12, wherein the forwarding mechanism is configured to repackage the composite message.

19. The apparatus of claim 12, wherein the address includes a Universal Resource Locator (URL), and wherein the access mechanism references the remote application on the second server computer system through the URL.

20. The apparatus of claim 12, wherein the remote application implements an electronic wallet.

21. A computer system that provides a client-side intermediary that redirects communications directed to an application on a client computer system to a remote application on a second server computer system, comprising:

a client computer system;

a first server computer system;

a network coupled to the first server computer system, the second server computer system and the client computer system;

a receiving mechanism that receives a composite message from a first server computer system directed to the application on the client computer system;

a reading mechanism, in communication with the receiving mechanism, that reads type information from the composite message, the type information specifying how the composite message is formatted and thereby implicitly specifying applications that are capable of processing the composite message;

an access mechanism, in communication with the reading mechanism, that uses the type information to trigger an access to the remote application on the second server computer system;

wherein the access mechanism is configured to use the type information to lookup the address of the remote application one the second server computer system that is capable processing the composite message;

wherein the lookup is performed using at least one table that translates the type information into an address of the remote application on the second server computer system; and a forwarding mechanism, in communication with the receiving mechanism, that forwards the composite message and subsequent composite messages of the same type to the remote application on the second server computer system using the access mechanism so that the remote application appears to exist on the client computer system in spite of the fact that the remote application actually exists on the second server computer system.

22. An apparatus that provides a client-side intermediary that redirects communications directed to an application on a client computer system to a remote application on a second server computer system, comprising:

a receiving means, for receiving a composite message from a first server computer system directed to the application on the client computer system;

a reading means, in communication with the receiving means, for reading type information from the composite message, the type information specifying how the composite message is formatted and thereby implicitly specifying applications that are capable of processing the composite message;

an access means, in communication with the reading means, that uses the type information to trigger an access to the remote application on the second server computer system;

wherein the access means uses the type information to lookup the address of the remote application one the second server computer system that is capable processing the composite message;

wherein the lookup is performed using at least one table that translates the type information into an address of the remote application on the second server computer system; and a forwarding means, in communication with the receiving means, for forwarding the composite message and subsequent composite messages of the same type to the remote application on the second server computer system using the access means so that the remote application appears to exist on the client computer system in spite of the fact that the remote application actually exists on the second server computer system.

23. A method for providing a client-side intermediary that redirects communications directed to an application on a client computer system to a remote application on a second server computer system, comprising:

receiving commands from a user at a client computer system;

allowing the user to interact with a first server computer system through the client computing system;

in response to interactions by the user, receiving a communication directed to the client computer system from the first server computer system;

examining the communication to determine what type of information is contained in the communications and thereby implicitly specifying applications that are capable of processing the composite message;

using the type information to lookup the address of the remote application one the second server computer system that is capable processing the composite message;

wherein the lookup is performed using at least one table that translates the type information into an address of the remote application on the second server computer system;

using the address to engage an access mechanism through which the remote application on the second server computer system can be accessed; and if the type of information in the communication can be processed by the remote application on a second server computer system, forwarding the communication to the remote application on the second server computer system so that the remote application appears to exist on the client computer system in spite of the fact that the remote application actually exists on the second server computer system.

24. The method of claim 23, wherein the remote application on the second server computer system implements an electronic wallet.

25. The method of claim 23, wherein forwarding the composite message to the remote application on the second server computer system includes repackaging the composite message.

26. The method of claim 25, wherein repackaging the composite message makes the composite message appear to originate from the client computing system.

27. The method of claim 25, wherein repackaging the composite message makes the composite message appear to originate from a third server computing system.

* * * * *